(12) United States Patent
Frait

(10) Patent No.: US 9,416,826 B2
(45) Date of Patent: Aug. 16, 2016

(54) DISCONNECT CLUTCH FOR MODULAR HYBRID ELECTRIC VEHICLE

(71) Applicant: FORD GLOBAL TECHNOLOGIES, LLC, Dearborn, MI (US)

(72) Inventor: Steven A. Frait, Milan, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 268 days.

(21) Appl. No.: 14/154,258

(22) Filed: Jan. 14, 2014

(65) Prior Publication Data

US 2014/0124321 A1    May 8, 2014

Related U.S. Application Data

(63) Continuation-in-part of application No. 13/362,018, filed on Jan. 31, 2012.

(51) Int. Cl.
*F16H 47/00* (2006.01)
*F16D 13/38* (2006.01)
*B60K 6/405* (2007.10)
*B60K 6/48* (2007.10)

(52) U.S. Cl.
CPC ............... *F16D 13/38* (2013.01); *B60K 6/405* (2013.01); *B60K 6/48* (2013.01); *B60Y 2304/076* (2013.01); *B60Y 2400/426* (2013.01); *Y02T 10/6221* (2013.01)

(58) Field of Classification Search
CPC ... B60K 6/48; B60K 6/405; B60K 2006/4825
USPC ........................................ 74/665, 730.1, 661
See application file for complete search history.

(56) References Cited

U.S. PATENT DOCUMENTS

| 7,509,802 | B2 * | 3/2009 | Hammond | B60K 6/26 60/330 |
| 7,679,238 | B2 | 3/2010 | Nomura et al. | |
| 2007/0007095 | A1 | 1/2007 | Tsukamoto et al. | |
| 2008/0093135 | A1 | 4/2008 | Nomura et al. | |
| 2008/0099258 | A1 * | 5/2008 | Berhan | B60K 6/405 180/65.22 |
| 2010/0038201 | A1 * | 2/2010 | Mueller | F16D 25/0638 192/3.29 |
| 2010/0105518 | A1 | 4/2010 | Kasuya et al. | |
| 2010/0105519 | A1 | 4/2010 | Kasuya et al. | |
| 2011/0011692 | A1 * | 1/2011 | Kuehnle | F16D 25/0638 192/3.33 |
| 2011/0132710 | A1 * | 6/2011 | Schenck | F16D 25/123 192/3.33 |
| 2011/0239818 | A1 | 10/2011 | Kasuya et al. | |
| 2011/0240430 | A1 | 10/2011 | Iwase et al. | |
| 2011/0240431 | A1 * | 10/2011 | Iwase | B60K 6/26 192/3.29 |
| 2012/0175212 | A1 * | 7/2012 | Hart | B60K 6/387 192/48.601 |
| 2012/0318630 | A1 * | 12/2012 | Iwase | F16D 25/0638 192/85.01 |

* cited by examiner

*Primary Examiner* — Ha D Ho
(74) *Attorney, Agent, or Firm* — David B. Kelley; MacMillan, Sobanski & Todd, LLC

(57) ABSTRACT

An assembly includes a shell fixed against axial displacement, a clutch including first plates secured to the shell by a spline, a member fixed against axial displacement, supporting the shell and secured to the shell by the spline, a retainer for limiting axial movement of the first plates and member along the spline, and a piston for forcing the plates along the spline toward the retainer.

20 Claims, 3 Drawing Sheets

DISCONNECT CLUTCH FOR MODULAR HYBRID ELECTRIC VEHICLE

CROSS REFERENCE TO RELATED APPLICATIONS

This is a continuation-in-part application of pending U.S. application Ser. No. 13/362,018, filed Jan. 31, 2012.

BACKGROUND OF INVENTION

This invention relates to a powertrain of hybrid electric vehicles, particularly to a powertrain module that can be installed between and secured to an engine output and a transmission input.

Hybrid electric vehicles (HEVs) have both an internal combustion engine and an electric machine, which are alternately, or in combination, used to propel the vehicle. A variety of different powertrains are used in hybrid vehicles such as a parallel configuration, in which the engine is connected to the motor by a disconnect clutch with the motor driving a torque converter input of an automatic power transmission. The transmission has an output which is connected to a differential coupled to the two driven wheels of the vehicle.

A need exists in the industry for a hybrid electric powertrain that includes a modular subassembly for use with a variety of engines and transmissions, such that the module can be installed between and secured to an output of one of a number of engines and to an input of one of a number of transmissions. The assembled powertrain may then be employed in a variety of vehicles. The module should include a hydraulically actuated disconnect clutch, the electric machine and suitable power paths between the engine and electric machine to the transmission input. Preferably, the module provides for hydraulic communication from the transmission's hydraulic system to the clutch, a balance dam and the electric machine. The module must provide an oil sump containing hydraulic fluid delivered to the module, and a path for continually returning that fluid to the transmission's oil sump so that the transmission pump is continually supplied reliably with fluid.

The module should require low manufacturing and assembly costs and no vehicle body modification, and should provide reliable performance.

SUMMARY OF INVENTION

An assembly includes a shell fixed against axial displacement, a clutch including first plates secured to the shell by a spline, a member fixed against axial displacement, supporting the shell and secured to the shell by the spline, a retainer for limiting axial movement of the first plates and member along the spline, and a piston for forcing the plates along the spline toward the retainer.

The assembly secures the wet disconnect clutch pack to the rotor of the electric machine using only one snap ring, which transmits a portion of the piston apply force to a bulkhead.

Because the shell transmits a portion of the piston apply force to parallel load paths, the last clutch reaction plate can be thinner than if a reaction block were used, thereby allowing the all clutch plates to be of uniform in size and of lower cost.

Because the shell is in contact with clutch plates, heat is readily transferred from the clutch plates to the shell, thereby providing a heat flow path for cooling the clutch plates.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

The invention will be more readily understood by reference to the following description, taken with the accompanying drawings, in which.

DETAILED DESCRIPTION

Figure 1A:
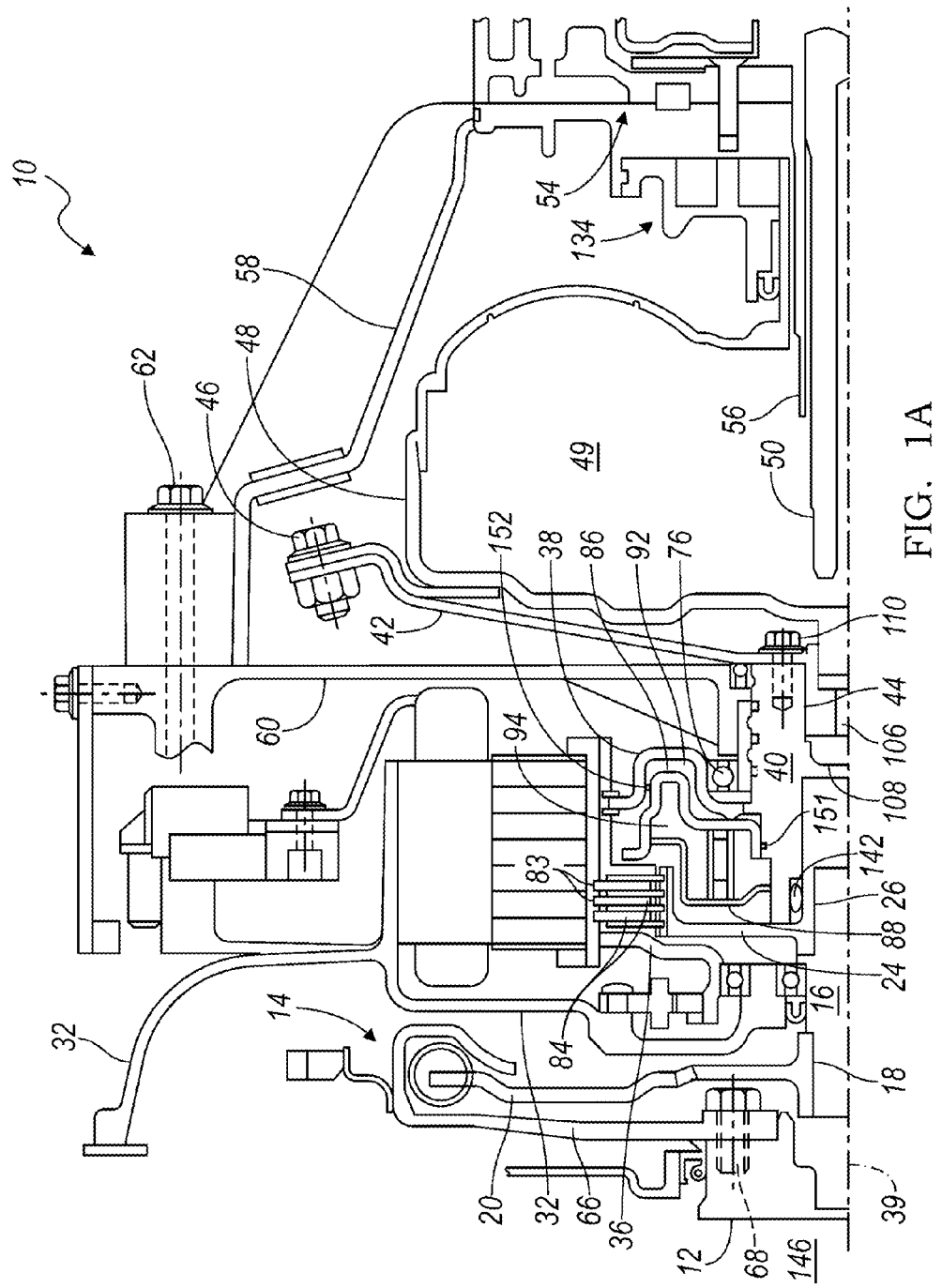
FIGS. 1A and 1B comprise a side cross-sectional view of a powertrain module showing a front connection to an engine output and a rear connection to a transmission torque converter input.
Figure 1B:
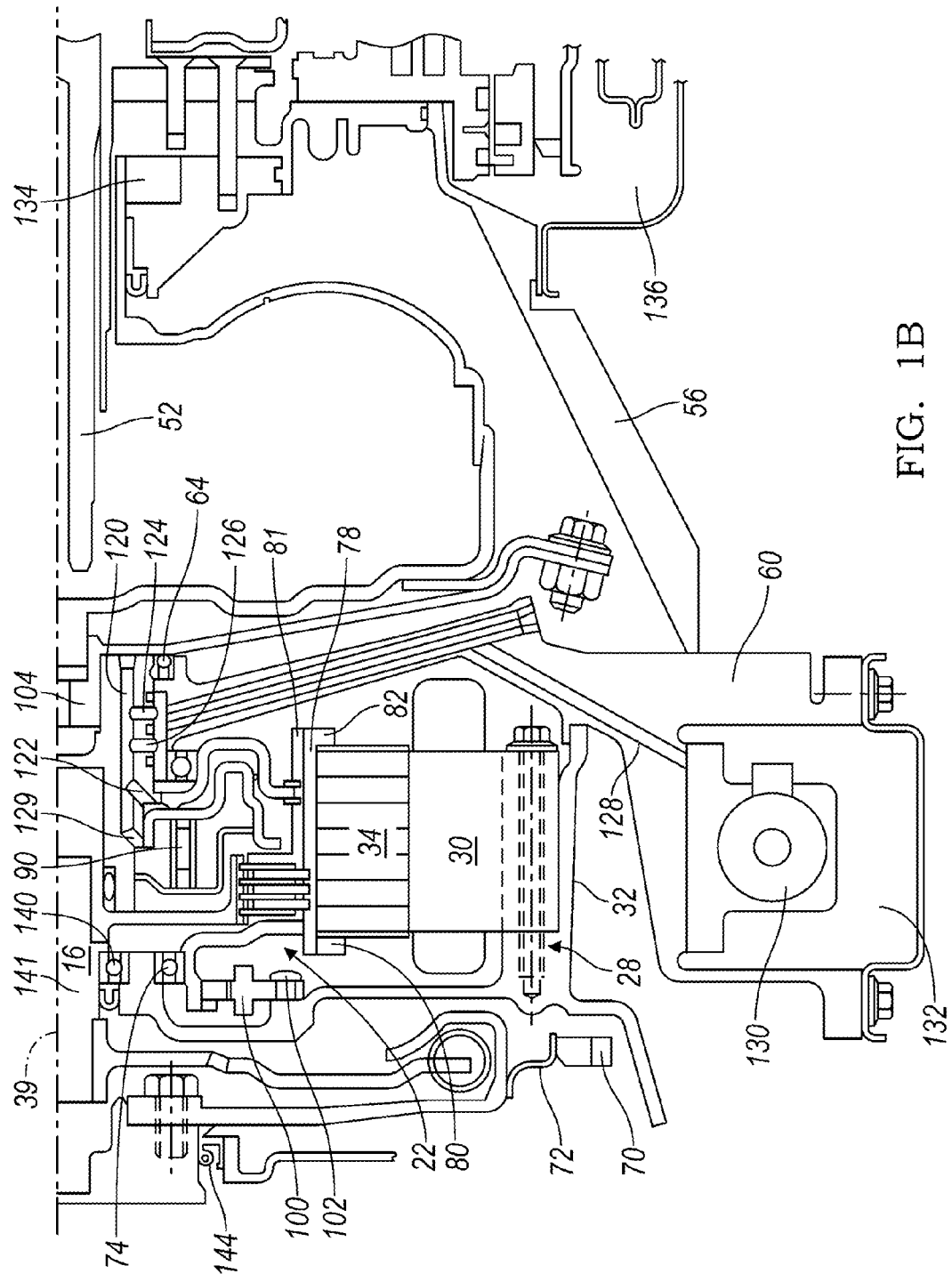

FIGS. 1A and 1B illustrate a module 10 of a powertrain for a hybrid electric vehicle that includes an engine having a rotary output 12; a torsional damper 14, secured to the engine output 12; an input shaft 16, secured by a spline 18 to an output 20 of damper 14; a disconnect clutch 22, supported on a clutch hub 24 that is secured by a spline 26 to input shaft 16; an electric machine 28, which includes a stator 30 bolted to a front bulkhead 32 and a rotor 34 supported by a first leg 36 and a second leg 38 for rotation about an axis 39; a rotor hub 40, secured preferably by a weld to leg 38; and a flexplate 42, secured at one end by a spline connection 44 or by bolts 110 to rotor hub 40 and secured at the opposite end by bolts 46 to a torque converter casing 48, which encloses a hydrokinetic torque converter 49. The electric machine 28 may be an electric motor or an electric motor-generator.

Torque converters suitable for use in the powertrain are disclosed in and described with reference to FIGS. 4a, 4b, 5, 12 and 15 of U.S. patent application Ser. No. 13/325,101, filed Dec. 14, 2011, the entire disclosure of which is herein incorporated by reference.

The torque converter 49 includes a bladed impeller wheel located within and secured to casing 48; a bladed turbine, driven hydrokinetically by the impeller and secured by a spline 50 to the input shaft 52 of an automatic transmission 54; and a bladed stator wheel, located between the turbine and stator and secured to a stator shaft 56, which is held against rotation on a transmission housing 58.

A rear bulkhead 60, secured by bolts 62 to the transmission housing 58, is fitted at its radial inner surface with a hydraulic seal 64, which contacts the radial outer surface of rotor hub 40.

A flywheel 66, secured by bolts 68 to the engine's rotary output 12, carries an engine starting gear 70, which is secured by a disc 72, welded to the starting gear and flywheel.

A bearing 74 supports the first leg 36 for rotation on the front bulkhead 32. A bearing 76 supports the second leg 38 for rotation on the rotor hub 40. A tube 78, aligned with axis 39 and supporting the rotor 34 for rotation about the axis, is secured to the first leg 36 and second leg 38. Lips 80, 82 at the front and rear ends, respectively, of tube 78 may be rolled radially outward to secure the rotor 34 to tube 78 and to prevent axial displacement of the rotor 34 relative to the tube. The inner surface of tube 78 is formed with an axial spline 81, which is engaged by the legs 36, 38 and alternate plates 83 of the disconnect clutch 22. The friction plates 84 of clutch 22 are secured by an axial spline formed on the radial outer surface of clutch hub 24.

A hydraulic servo for actuating clutch 22 includes a piston 86, balance dam 88, return spring 90 and hydraulic lines for transmitting actuating pressure to the pressure control volume 92 at the right hand side of piston 86 and to the pressure balance volume 94 at the left hand side of the piston. Piston 86 moves leftward in a cylinder formed by the rear leg 38 when actuating pressure and hydraulic fluid is supplied to volume 92, by the use of seals 151 and 152, thereby causing clutch 22 to engage and driveably connect rotor 34 and the engine output 12 through damper 14, input shaft 16, clutch hub 24 and clutch 22.

Because the piston 86, balance dam 88 and return spring 90 are supported on the rotor hub 40, rotational inertia of the piston 86, balance dam 88 and return spring 90 is located on the output side, i.e., the rotor side of clutch 22.

Rotor 34 is continually driveably connected to the transmission input shaft 52 through the torque path that includes rear leg 38, rotor hub 40, flexplate 42, torque converter casing 48, the hydrodynamic drive connection between the torque converter impeller and turbine, which is connected by spline 50 to transmission input shaft 52.

A resolver 100, a highly accurate type of rotary electrical transformer used for measuring degrees of rotation, is secured by bolts 102 to the front bulkhead 32, is supported on the front bulkhead 32 and first leg, and is located axially between the front bulkhead 32 and rear bulkhead 60.

The teeth of spline 44, which produces a rotary drive connection between flexplate 42 and rotor hub 40, are fitted together such that no lash is produced when torque is transmitted between the flexplate and rotor hub. Flexplate 42 is formed with a thick walled portion 104 having a threaded hole 106 that terminate at a web 108. The external spline teeth on flexplate 42 are forced axially into engagement with the internal spline teeth on rotor hub 40 by bolts 110, which engage threaded holes in the right-hand end of rotor hub 40. The engaged spline teeth at the spline connection 44 are disengaged upon removing bolts 110 and threading a larger bolt into hole 106 such that the bolt contacts web, thereby forcing flexplate axial rightward.

Rotor hub 40 is formed with multiple axially-directed hydraulic passages 120 and laterally-directed passages 122, 124, 126, 128, 129, which carry hydraulic fluid and pressure to module 10 from the hydraulic system of the transmission 54. Passages 120, 122, 124, 126, 128, 129 carry hydraulic fluid and pressure which includes to the control volume 92 of the servo of clutch 22 located at the right hand side of piston 86, to the pressure balance volume 94 between balance dam 88 and the piston, to a variable force solenoid (VFS) 130, and to the surfaces of rotor 34 and stator 30, which surfaces are cooled by the fluid. The rear bulkhead 60 is formed with passage 128, which communicates hydraulically with VFS 130.

The rear bulkhead 60 supports a sump 132, which contains fluid supplied to module 10 from the hydraulic system of the transmission 54. Transmission 54 includes a sump 136, which contains hydraulic fluid that is supplied by a transmission pump 134 to the transmission hydraulic system, from which fluid and control pressure is supplied to module 10, torque converter 49, transmission clutches and brakes, bearings, shafts, gears, etc.

A bearing 140, fitted in the front bulkhead 32, and a bearing 142, fitted in the rotor hub 40, support input shaft 16 in rotation about axis 39. The front bulkhead 32 also supports the stator 30 in its proper axial and radial positions relative to the rotor 34. Bearing 76, fitted between rear bulkhead 60 and rotor hub 40, and bearing 142 support rotor hub 40 in rotation about axis 39. The front and rear bulkheads 32, 60 together support rotor 34 in rotation about axis 39 due to bearing 74, fitted in bulkhead 32, and bearing 76, fitted in bulkhead 60.

Seal 64, fitted in the rear bulkhead 60, and seal 141, fitted in the front bulkhead 32, prevent passage of fluid from module 10 located between the bulkheads 32, 60. Another dynamic seal 144 prevents passage of contaminants between the engine compartment 146 and module 10.

The components of module 10 are installed and assembled in the module. The assembled module can then be installed between and connected to the engine output 12 and the torque converter casing 48.

In operation, when the engine output 12 is driven by an engine, torque is transmitted from the engine through rotor hub 40 and flexplate 42 to the torque converter casing 48, provided that clutch 22 is engaged. The rotor 34 electric machine 28 is continually driveably connected through tube 78, leg 38, rotor hub 40 and flexplate 42 to the torque converter casing 48. Therefore, the torque converter casing 48 can be driven by the engine alone, provided the electric machine 28 is off and clutch 22 is engaged; by the electric machine alone, provided the engine is off or the engine in operating and the clutch is disengaged; and by both the engine and electric machine concurrently.

Figure 2:
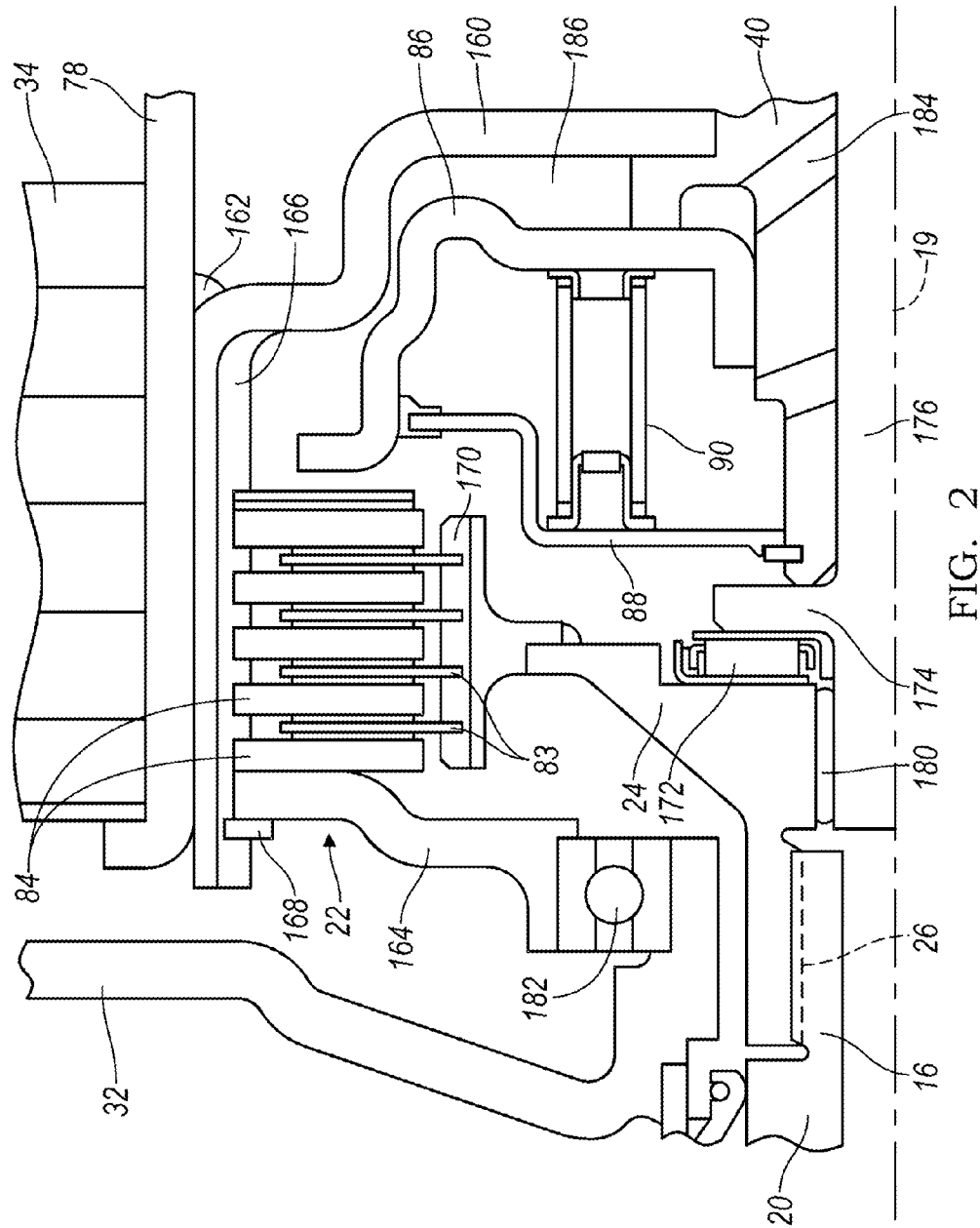
FIG. 2 is a side cross-sectional view of a portion of the powertrain module showing a component functioning as a clutch reaction plate and a forward support of the electric machine's rotor.

Referring to FIG. 2, the rotor 34 of electric machine 28 is supported on tube 78, which is supported by a shell 160, connected by a weld 162 to tube 78 and by welding to rotor hub 40, and by a leg 164, secured through an axial, inner spline 166 to shell 160. A single snap ring 168, secured to the shell 160 and contacting leg 164, limits axial displacement of the friction plates 84, which are secured by spline 166 to shell 160. Spacer plates 83 are secured by an external axial spline 170 on clutch hub 24.

A thrust bearing 172 contacts clutch hub 24 and a flange 174 on a shaft 176 that is parallel to axis 19. A bearing 180 supports clutch hub 24 on shaft 176. The engine output 12 is connected through flywheel 66, damper 20, input shaft 16 and spline 26 to clutch hub 24.

A bearing 182, fitted between front bulkhead 32 and leg 164, supports the rotor 34 for rotation about axis 19 and provides a reaction to axial force transmitted between leg 164 and bulkhead 32.

In operation, piston 86 moves leftward against the force of return spring 90 when pressurized hydraulic fluid is supplied through passage 184 to the cylinder 186 that contains piston 86. Disconnect clutch 22 is engaged when friction plates 83 and spacer plates 84 are forced by piston 86 into mutual frictional contact, thereby producing a drive connection between rotor hub 40 and the engine output 12. Rotor 34 is continually driveably connected to rotor hub 40 through shell 160.

The leftward axial force applied by piston 86 is transmitted through plates 83, 84 through 164, and snap ring 168 and shell 160.

In accordance with the provisions of the patent statutes, the preferred embodiment has been described. However, it should be noted that the alternate embodiments can be practiced otherwise than as specifically illustrated and described.

What is claimed is:

1. An assembly, comprising:
a shell fixed against axial displacement;
a clutch including first plates secured to the shell by a spline;
a member fixed against axial displacement, supporting the shell and secured to the shell via the spline;
a retainer for limiting axial movement of the first plates and member along the spline;

a piston for forcing the first plates along the spline toward the retainer.

2. The assembly of claim 1, further comprising a bearing fixed against axial displacement and contacting the member.

3. The assembly of claim 2, further comprising:
a second member fixed against axial displacement and contacting the bearing;
a third member fixed against axial displacement and contacting the shell.

4. The assembly of claim 1, wherein the retainer is a snap ring secured to the shell and contacting the member, the member contacting the spline between one of the first plates and the snap ring.

5. The assembly of claim 1, further comprising:
a clutch hub including a second spline; and
second plates interleaved with the first plates and secured to the clutch hub by the second spline.

6. The assembly of claim 1, further comprising an electric machine including a rotor secured to and supported on the shell.

7. The assembly of claim 1, wherein the clutch alternately opens and closes a drive connection between a power source and the shell.

8. The assembly of claim 1, further comprising:
second and third members fixed against axial displacement; and wherein
the retainer transmits to the shell a first portion of an axial force produced by the piston and carried by the shell to the second member; and
the retainer transmits to the member a second portion of the axial force produced by the piston and carried by the member to the third member.

9. The assembly of claim 1 wherein the retainer is configured to limit axial movement in a first direction along the spline of the first plates and the member.

10. The assembly of claim 4 wherein the one of the first plates contacting the member is the same thickness as the other first plates.

11. An assembly, comprising:
a shell fixed against axial displacement;
a clutch including first plates secured to the shell by a spline, and second plates interleaved with the first plates;
a piston for forcing the first and second plates into contact;
a member fixed against axial displacement, secured to the shell via the spline and located at an axial end of the first and second plates opposite a location of the piston;
a retainer for limiting axial movement of the first and second plates and member along the spline.

12. The assembly of claim 11, further comprising:
a clutch hub including a second spline, the second plates being interleaved with the first plates and secured to the clutch hub by the second spline.

13. The assembly of claim 11, further comprising a bearing fixed against axial displacement and contacting the member.

14. The assembly of claim 13, further comprising:
a second member fixed against axial displacement and contacting the bearing;
a third member fixed against axial displacement and contacting the shell.

15. The assembly of claim 14, wherein:
the retainer transmits to the shell a first portion of an axial force produced by the piston and carried by the shell to the third member; and
the retainer transmits to the member a second portion of the axial force produced by the piston and carried by the member to the bearing.

16. The assembly of claim 11, wherein the retainer is a snap ring secured to the shell and contacting the member, the member contacting the spline between one of the first plates and the snap ring.

17. The assembly of claim 11, further comprising an electric machine including a rotor secured to and supported on the shell.

18. The assembly of claim 11, wherein the clutch alternately opens and closes a drive connection between a power source and the shell.

19. The assembly of claim 11 wherein the retainer is configured to limit axial movement in a first direction along the spline of the first and second plates and the member.

20. The assembly of claim 16 wherein the one of the first plates contacting the member is the same thickness as the other first plates.

* * * * *